(12) United States Patent
Le Saint

(10) Patent No.: US 8,376,700 B2
(45) Date of Patent: Feb. 19, 2013

(54) COMPRESSED AIR STARTER FOR TURBOMACHINE

(75) Inventor: Rachel Le Saint, Mondonville (FR)

(73) Assignee: Microturbo SA, Toulouse (FR)

( * ) Notice: Subject to any disclaimer, the term of this patent is extended or adjusted under 35 U.S.C. 154(b) by 391 days.

(21) Appl. No.: 12/699,276

(22) Filed: Feb. 3, 2010

(65) Prior Publication Data

US 2010/0192594 A1 Aug. 5, 2010

(30) Foreign Application Priority Data

Feb. 5, 2009 (FR) ...................................... 09 50709

(51) Int. Cl.
*F01D 25/24* (2006.01)
*F03B 11/02* (2006.01)
*F03D 11/00* (2006.01)
*F04D 29/40* (2006.01)

(52) U.S. Cl. ........... 415/214.1; 60/786; 60/788; 60/784; 60/804; 60/787; 415/9

(58) Field of Classification Search ............ 60/786–788, 60/784, 802, 778; 244/53 A; 123/179.1; 415/9, 214.1

See application file for complete search history.

(56) References Cited

U.S. PATENT DOCUMENTS

| 3,521,505 | A | 7/1970 | Sebring |
| 4,926,631 | A | 5/1990 | Sorenson |
| 5,435,125 | A | 7/1995 | Telakowski |
| 6,681,579 | B2 * | 1/2004 | Lane et al. ....................... 60/787 |
| 2004/0234369 | A1 * | 11/2004 | Feest .............................. 415/104 |
| 2005/0058542 | A1 * | 3/2005 | Kruegel et al. ................ 415/191 |

* cited by examiner

*Primary Examiner* — William H Rodriguez
*Assistant Examiner* — Craig Kim
(74) *Attorney, Agent, or Firm* — Oblon, Spivak, McClelland, Maier & Neustadt, L.L.P.

(57) ABSTRACT

An air starter for turbomachine, including a forward casing, an aft casing, an annular exhaust flow path opening up between an aft end of the forward casing and a forward end of the aft casing, and a cylindrical outlet mesh of the exhaust flow path is disclosed. The forward and aft ends of the outlet mesh include devices for axially retaining the forward casing and the aft casing respectively to the mesh. At least one of the devices for axially retaining one of the casings to the mesh enables a relative rotation of the mesh and this casing.

13 Claims, 2 Drawing Sheets

COMPRESSED AIR STARTER FOR TURBOMACHINE

TECHNICAL FIELD

This invention relates to an air starter for a turbomachine, particularly such as a turbomachine for an aircraft.

Turbomachine aircraft engines are usually equipped with air starters, comprising (from the forward towards the aft part) an air inlet duct, a turbine, and power transmission means that will be coupled to these engines, for example through an Accessory Gear Box (AGB) on these engines.

When it is supplied with compressed air, the starter turbine will rotate the power transmission means which in turn will rotate a rotor of the turbomachine to start it.

Air starters for aircraft engines are usually designed to start these engines on the ground, but also to restart them in flight if the engine should stall.

Therefore, the reliability of air starters is of overriding importance for the safety of aircraft and to obtain the certifications necessary to use these starters.

STATE OF PRIOR ART

Air starters of a known type comprise a forward casing surrounding their turbine and fixed to their air inlet duct, and an aft casing surrounding the power transmission means of these starters.

The aft end of the forward casing of these starters is axially separated from the forward end of their aft casing to form an annular outlet space of an exhaust flow path through which the airflow from the turbine of these starters will pass.

The two casings are usually rigidly connected by arms passing through the exhaust flow path.

Furthermore, the aft end of the forward casing and the forward end of the aft casing are usually connected by a cylindrical mesh, which limits the risks of ingress of outside projectiles into the exhaust flow path when stopped, and risks of the projection of debris outside the exhaust flow path when an incident occurs during operation.

A turbine burst in a starter is a very rare phenomenon, which can occur theoretically after a racing of the turbine rotor or a breakage of the shaft of this turbine.

In case of such an incident, debris could be projected inside the turbine at high speed and generate impacts at the forward casing that surrounds this turbine.

Due to the rotational movement of the turbine, this debris could transmit tangential forces to the forward casing in addition to radial forces, which could generate a torque transmitted to this forward casing, and the debris could thus break the arms connecting this forward casing to the aft casing, and break the outlet mesh if it is fixed to the ends of these casings, causing separation between the two casings of the starter.

A known solution for preventing risks of the starter casings being separated consists of connecting the aft end of the forward casing and the forward end of the aft casing by structural elements made from a material capable of resisting the stresses generated by a turbine burst, these structural elements possibly being placed close to the outlet mesh from the exhaust flow path.

However, a starter of this type has disadvantages. Said structural elements must be made from a relatively heavy and/or expensive material. Furthermore, in case of a turbine burst, these structural elements could transmit the torque induced by impacts of debris on the forward casing of the starter, to the aft casing of this starter, which could damage attachment means of this aft casing onto a turbomachine.

PRESENTATION OF THE INVENTION

The purpose of the invention is particularly to provide a simple, economic and efficient solution to these problems in order to avoid the above mentioned disadvantages.

In particular, its purpose is to minimise risks of separation of the forward and aft casings of an air starter, particularly in case of a burst of the turbine of this starter.

Another purpose is to limit forces transmitted to the aft casing following such a turbine burst.

To achieve this, this invention proposes an air starter for a turbomachine including a turbine surrounded by a forward casing of the starter, turbine power transmission means that are surrounded by an aft casing of the starter, means of rigid connection of the forward casing to the aft casing, an exhaust flow path designed to carry an airflow stream from the turbine that opens up between an aft end of the forward casing and a forward end of the aft casing and through which said means of rigid connection pass, and an outlet mesh of the exhaust flow path that extends around a turbine shaft and the forward and aft ends of which comprise means of axially retaining the forward and aft casings respectively to the mesh, these axially retaining means being designed at least to prevent relative separation between the forward and aft casings, wherein at least said means of axially retaining one of the casings to the outlet mesh enable relative rotation of said outlet mesh and said casing.

When a breakage occurs in the means of rigid connection of the forward and aft casings, for example following a burst of the starter turbine, the means of axially retaining the casings to the mesh can maintain the integrity of the starter while preventing rotation forces passing into the forward casing from being transmitted to the aft casing by passing into the mesh and thus causing breakage of this mesh or damaging means of attachment of the starter to the turbomachine.

Such rotation forces can be at least partially dissipated by allowing the forward casing to rotate relative to the aft casing, which is possible due to use of the axially retaining means according to the invention.

The starter according to the invention can better satisfy certification requirements, while being lighter in weight and more reliable than known types of starters.

The means of axially retaining said casing to the mesh preferably comprise a retaining device connected to the corresponding end of the mesh and which extends facing a stop element of said casing along the axial direction.

The retaining device of the mesh will be held bearing in contact with the casing stop element when the means of rigid connection of the forward casing to the aft casing break, so as to axially retain this mesh to this casing.

Advantageously, said casing comprises, at its end facing the exhaust flow path, an annular wall extending radially outwards, this annular wall possibly forming a flange for attachment of said means of rigid connection of the two casings.

In a first embodiment of the invention, said annular wall of said casing forms said stop element of this casing.

The outlet mesh preferably comprises two approximately annular end parts between which a median part is arranged in which openings are formed for passage of the airflow from the turbine.

The mechanical strength of the end parts of the mesh is sufficiently high so that they can axially retain the casings to the mesh.

Advantageously, at least one of the end parts of the mesh is radially curved towards the inside of the starter and forms said retaining device.

This end part of the mesh axially retains said casing to the mesh by bearing in contact with said stop element of said casing.

In a second embodiment of the invention, the starter comprises an annular part including a radial flange fixed onto said annular wall of said casing, and a wall extending radially towards the inside of the starter and arranged at an axial distance from said annular wall of said casing so as to form said stop element of this casing.

Advantageously, the section of this annular part is U-shaped with its opening facing the inside of the starter.

The annular part mentioned above thus delimits an annular groove opening up towards the inside of the starter into which the annular end wall of said casing and said retaining device may possibly fit. If applicable, this groove may also contain a radial flange of the means of rigid connection.

In the second embodiment of the invention, the mesh comprises two approximately annular end parts between which a median part is arranged in which openings are formed for passage of the airflow from the turbine, at least one of said end parts of the mesh being radially curved towards the outside of the starter and forming said retaining device.

This end part of the mesh can then axially retain said casing to the mesh by bearing in contact with said wall of the annular part that forms the stop element of said casing.

In general, the other end part of the mesh is advantageously fixed to the other casing.

This avoids axial displacements of the mesh relative to the casings during normal operation, even if the retaining device of the mesh is not applied in contact with the stop element of the corresponding casing, but extends at a certain axial distance from this stop element.

This makes it possible to increase the manufacturing tolerances of the mesh, so as to reduce the manufacturing cost of the mesh.

The two end parts of the mesh are preferably connected to each other by arms, between which the above mentioned openings are formed.

The mesh is advantageously formed from at least two sectors forming portion of a cylinder that are fitted circumferentially end to end to facilitate assembly of the mesh on the starter.

BRIEF DESCRIPTION OF THE DRAWINGS

The invention will be better understood and other details, advantages and characteristics of it will become clear after reading the following description given as a non-limitative example with reference to the appended drawings in which.

In these figures, the same references are used to refer to identical or similar elements.

DETAILED PRESENTATION OF PREFERRED EMBODIMENTS

Figure 1:
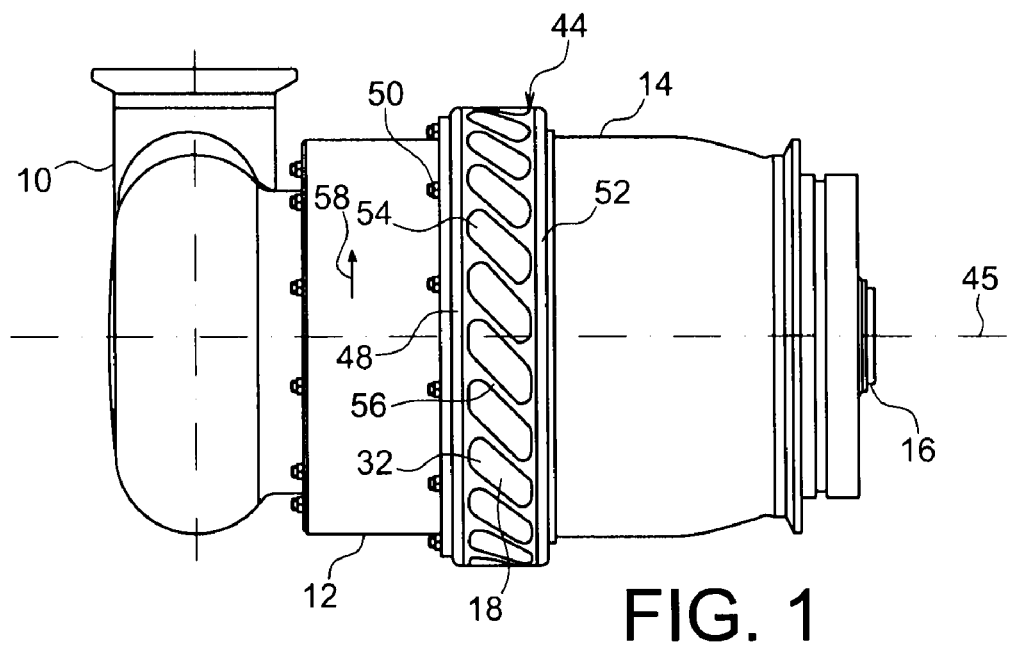
FIG. 1 is a diagrammatic side view of an air starter according to a first embodiment of the invention.

FIG. 1 shows an air starter conforming with a first embodiment of the invention designed to be fitted on an aircraft turbojet.

This starter comprises an air inlet duct 10, an approximately cylindrical forward casing 12 surrounding a drive turbine, an approximately cylindrical aft casing 14 surrounding power transmission means, and means 16 of attaching the starter to an aircraft turbojet (not shown) and coupling the starter to an accessory gear box of this aircraft turbojet.

The air inlet duct 10 will be connected to a high pressure air source that can be onboard or on the ground.

The attachment and coupling means 16 are designed to fix the power transmission means and a rotor of the turbojet to each other in rotation, and to fix the starter to the turbojet.

During operation, the high pressure airflow supplying the turbine rotates a bladed wheel of this turbine, this bladed wheel in turn rotating the power transmission means that are connected to the turbojet rotor through coupling means 16, in a well known manner.

The ends facing each other of the forward casing 12 and the aft casing 14 are axially separated from each other to form an annular outlet space 18 through which air from the turbine can escape.

Figure 2:
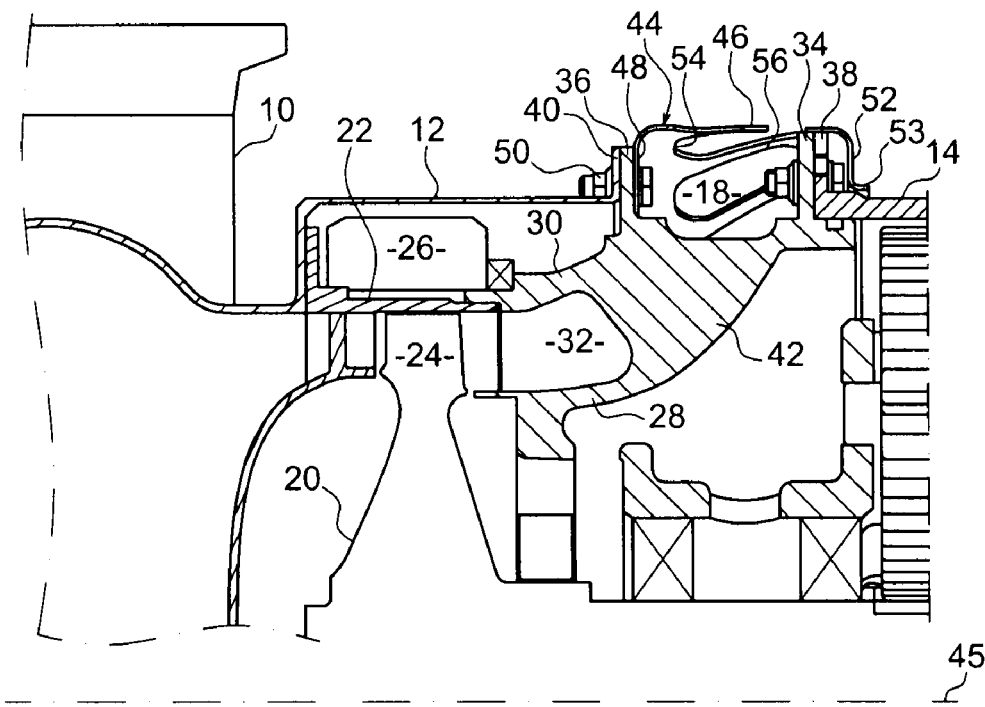
FIG. 2 is an axial section showing a diagrammatic view of a part of the air starter in FIG. 1.

As shown in FIG. 2, the bladed wheel 20 of the turbine is surrounded by a turbine shroud 22 disposed closely adjacent to the tips of the blades 24 supported by the bladed wheel 20, to guide the high pressure airflow passing in the turbine.

The shroud 22 itself is surrounded by a retention ring 26 that will absorb all or some of the impact energy from any debris projected towards the outside of the turbine when this turbine bursts, in a known manner.

The starter comprises two coaxial annular envelopes 28 and 30 that delimit the inside and outside respectively of a flow path 32 for airflow from the turbine, usually called the exhaust flow path.

Said annular envelopes 28 and 30 comprise respective radial annular flanges 34 and 36 at their aft ends. Said radial annular flanges 34 and 36 are fixed by bolting to radial annular flanges 38 and 40 formed on the forward end of the aft casing 14 and the aft end of the forward casing 12 respectively, such that the exhaust flow path 32 opens up into the annular outlet space 18 formed between these ends of the casings 12 and 14.

The cross section of the annular envelopes 28 and 30 becomes broader from the forward end towards the aft end and these envelopes are curved, so as to deviate the airflow radially outwards, from the inlet of the exhaust flow path 32 to its outlet.

The annular envelopes 28 and 30 are connected to each other by radial arms 42 made of aluminium and that pass through the exhaust flow path 32. In the example shown in FIGS. 1 and 2, these arms 42 are made in a single piece with the annular envelopes 28 and 30.

The arms 42 make a rigid connection between the forward casing 12 and the aft casing 14, thus maintaining the integrity of the starter during normal operation.

Furthermore, the exhaust flow path 32 is protected by an approximately cylindrical outlet mesh 44 that extends around a turbine shaft 45 from the aft end of the forward casing 12 as far as the forward end of the aft casing 14.

This mesh 44 is designed to prevent the ingress of external projectiles into the exhaust flow path when stopped, and to limit the risks of any debris being projected outside the starter during operation, particularly if the turbine bursts.

The outlet mesh 44 comprises a median part 46 with openings in it that connects the two approximately annular parts (the forward and aft parts respectively) to each other.

The outlet mesh 44 is made from a material with good mechanical strength and good resistance to high temperature, for example such as "Hastelloy X" (registered trademark).

This mesh is formed from two cylindrical shaped portions mounted circumferentially end to end so as to facilitate assembly of the mesh on the starter.

The forward end part of the outlet mesh 44 is radially curved towards the inside of the starter and forms a radial flange 48 for attachment of the mesh 44 to the corresponding radial flanges 36 and 40 of the annular envelope 30 and the forward casing 12. To achieve this, the flange 40 of the forward casing 12 and the flange 48 of the mesh 44 are held fixed in contact with the forward and aft faces respectively of the flange 36 by bolts 50 uniformly distributed around the starter axis.

The aft end part of the mesh 44 is also radially curved towards the inside of the starter, and this aft end part is located behind the aft end of the radial flange 38 of the aft casing 14, at a short axial distance from this flange without being fixed to it. This aft end part forms a radial wall 52 forming a retaining device axially retaining the mesh 44 to the aft casing 14, as described more clearly in the following. The radially inner end of the radial wall 52 is curved towards the aft end of the starter and forms a projection 53 that improves the mechanical strength of this radial wall 52.

Oblong openings 54 are cut into the median part 46 of the outlet mesh 44, and these openings 54 are separated from each other by arms 56 of the mesh 44 that connect the end parts of this mesh 44 to each other.

The outlet mesh 44 keeps the casings and the starter fixed to each other if the turbine of this starter should burst.

During such an incident, debris from the bladed wheel 20 may be projected radially and cause violent impacts to the turbine shroud 22 and the retention ring 26, so as to apply rotation forces to the forward casing 12 in the same direction as the direction of rotation 58 of the bladed wheel 20 (FIG. 1).

These rotation forces may be sufficiently high to break the arms 42 making the rigid connection between the forward casing 12 and the aft casing 14. The forward casing 12 of the starter to which axial forces are applied in the forward direction due to the thrust of the gases in the turbine, then moves forwards until the radial wall 52 of the aft end of the mesh 44 comes into contact with the radial flange 38 of the forward end of the aft casing 14, and thus axially retains this aft casing 14 to this mesh 44.

The axial retention of the aft casing 14 to the outlet mesh 44 through the radial wall 52 of the mesh leaves the forward casing 12 and the mesh 44 free to rotate relative to the aft casing 14. Thus, the rotation forces in the forward casing 12 can be dissipated without breaking the arms 56 of the mesh 44, and without being transmitted to the aft casing 14 and to the attachment and coupling means 16 of the starter.

In the example described above, the radial wall 52 providing axial retention for the outlet mesh 44 extends at an axial distance from the radial flange 38 of the aft casing during normal operation, and is not applied in contact with this flange 38 except when the forward casing 12 is displaced forwards, following a burst of the starter turbine. Since the forward end part of the mesh 44 is fixed to the forward casing and thus prevents the mesh from axial displacement relative to the casings in normal operation, it is not necessary for the radial wall 52 to be continuously in contact with the radial flange 38 of the aft casing. Therefore, manufacturing tolerances of the mesh 44 can be increased so as to reduce the manufacturing cost of this mesh.

As a variant, the radial wall 52 may be continuously in contact with the flange 38 if it is required.

Furthermore, instead of the radial attachment flange 48, the mesh 44 may comprise a second radial wall providing axial retention formed at the forward end of the mesh and extending forwards from the flange 40 of the forward casing 12. However, to prevent axial displacements of the mesh 44 during normal operation, in this case it is preferable if the two radial walls retaining this mesh are continuously in contact with the corresponding flanges 40 and 38 of the casings 12 and 14 respectively.

In another variant, the outlet mesh 44 may comprise two annular ribs instead of a radial wall at its ends, formed on radially internal annular surfaces of the forward and aft parts respectively of the mesh 44, these ribs being engaged in two complementary shaped grooves formed at the aft end of the forward casing 12 and at the forward end of the aft casing 14 respectively, to axially retain these casings to the mesh 44 in a manner similar to that described above.

Figure 3:
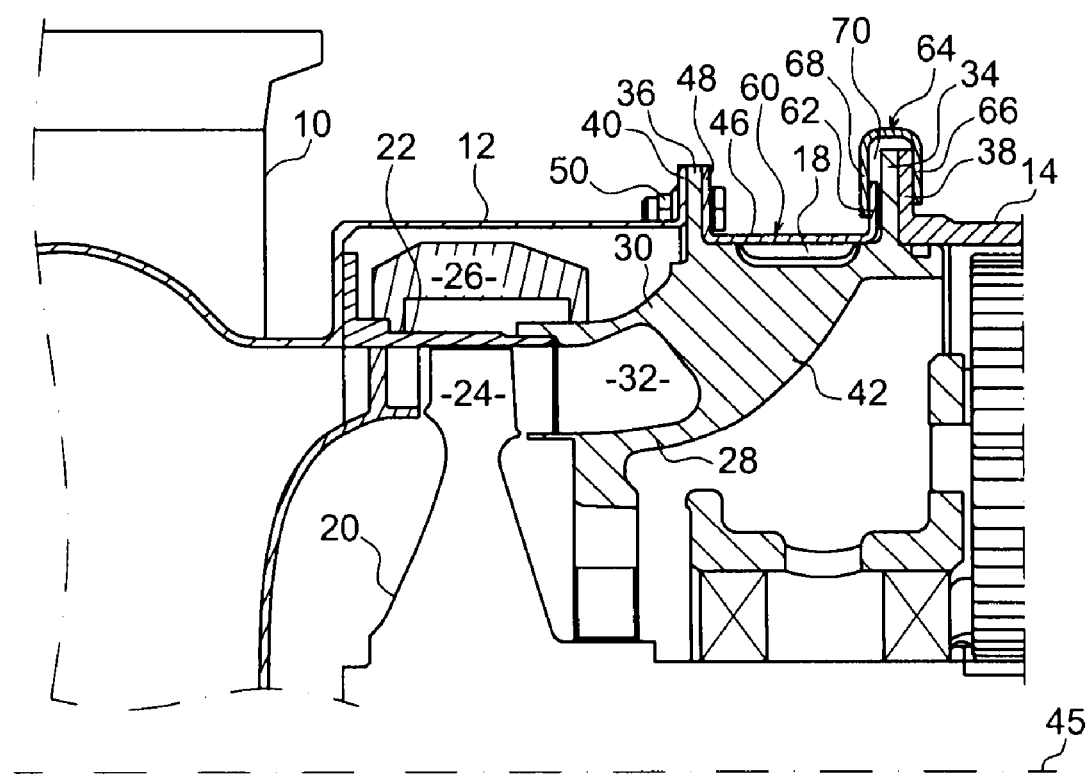
FIG. 3 is an axial section showing a diagrammatic view of a part of an air starter according to a second embodiment of the invention.

FIG. 3 shows an air starter according to a second embodiment of the invention.

This starter comprises an outlet mesh 60 for the exhaust flow path 32 that is similar to the outlet mesh 44 of the starter described above, but which is different from this mesh 44 essentially in that the aft end part of the mesh 60 is radially curved towards the outside of the starter so as to form a radial wall 62 extending forwards from the radial flange 38 of the aft casing 14 of this starter.

This starter comprises a U-shaped annular part 64 that opens radially towards the inside of the starter and that is fixed onto the flange 34 of the annular envelope 28 delimiting the inside of the exhaust flow path 32, and onto the flange 38 of the forward end of the aft casing 14.

The annular part 64 has an aft radial wall that is fixed onto the flange 38 of the aft casing 14 by bolts (not shown in FIG. 3) or similar means, and a forward radial wall 68 that extends at an axial distance from the flange 34 of the envelope 28 so as to form a radial annular groove 70.

The radial wall 62 of the aft end of the outlet mesh 60 extends freely in the annular groove 70 of the annular part 64 such that this wall 62 forms a device axially retaining the outlet mesh 60 to the forward radial wall 68 of the annular part 64, and therefore to the aft casing 14 fixed to this annular part 64.

For example, the annular part 64 is formed of two ring sectors that are mounted circumferentially end to end.

The forward end part of the mesh 60 is also curved outwards and forms a radial flange 48 for attachment of this mesh 60 to the corresponding radial flanges of the annular envelope 30 and the forward casing 12, in a manner similar to what was described above in relation to the first embodiment of the invention.

The shape of the median part with openings 46 of the mesh 44 or the mesh 60 may be different to what is described above without going outside the framework of the invention. For example, this median part may be formed of rods or arms that are interlaced or arranged as a lattice. The mesh may also be made of more than one piece and consist of elements fixed to each other, for example two annular end structures and rods with their ends fixed to these annular structures.

In general, the invention can maintain the integrity of an air starter if the turbine of this starter bursts, and thus satisfy the corresponding certification requirements while reducing the weight of such a starter and increasing its reliability.

The invention claimed is:
1. An air starter for a turbomachine, comprising:
a turbine surrounded by a forward casing of the air starter,
turbine power transmission means that are surrounded by an aft casing of the air starter,
means of rigid connection of the forward casing to the aft casing, an exhaust flow path designed to carry an airflow stream from the turbine, the exhaust flow path opening up between an aft end of the forward casing and a forward end of the aft casing, and the exhaust flow path being passed through by said means of rigid connection, and an outlet mesh of the exhaust flow path that extends around a turbine shaft, the forward end of the outlet mesh includes first means for axially retaining the forward casing to the outlet mesh and the aft end of the outlet mesh includes second means for axially retaining the aft casing to the outlet mesh, the first and second means for axially retaining said casings to the outlet mesh being designed at least to prevent relative separation between the forward and aft casings, wherein at least one of said first and second means for axially retaining said casings to the outlet mesh enable relative rotation of the outlet mesh and the corresponding casing.

2. The air starter according to claim 1, wherein said first and second means for axially retaining said casings to the outlet mesh comprise a retaining device connected to the corresponding end of the outlet mesh and facing a stop element of said casing along an axial direction.

3. The air starter according to claim 2, wherein said casing comprises, at its end facing the exhaust flow path, an annular wall extending radially outwards.

4. The air starter according to claim 3, wherein said annular wall of said casing forms a flange for attachment of said means of rigid connection.

5. The air starter according to claim 3 or 4, wherein said annular wall of said casing forms said stop element of said casing.

6. The air starter according to claim 2, wherein the outlet mesh comprises two approximately annular end parts between which a median part is arranged in which openings are formed for passage of the airflow from the turbine.

7. The air starter according to claim 6, wherein at least one of said end parts of the outlet mesh is radially curved towards the inside of the air starter and forms said retaining device.

8. The air starter according to claim 3, further comprising an annular part including a radial flange fixed onto said annular wall of said casing, and a wall extending radially towards the inside of the air starter and arranged at an axial distance from said annular wall of said casing so as to form said stop element of said casing.

9. The air starter according to claim 8, wherein a section of said annular part is U-shaped with its opening facing the inside of the air starter.

10. The air starter according to claim 8, wherein the outlet mesh comprises two approximately annular end parts between which a median part is arranged in which openings are formed for passage of the airflow from the turbine, at least one of said end parts of the outlet mesh being radially curved towards the outside of the air starter and forming said retaining device.

11. The air starter according to claim 7 or 10, wherein the other end part of the outlet mesh is fixed to the other casing.

12. The air starter according to claim 6 or 10, wherein said two end parts of the outlet mesh are connected to each other by arms between which openings are formed.

13. The air starter according to claim 1, wherein the outlet mesh is formed from at least two sectors forming portion of a cylinder that are fitted circumferentially end to end.

* * * * *